(12) United States Patent
Ito et al.

(10) Patent No.: US 11,248,653 B2
(45) Date of Patent: *Feb. 15, 2022

(54) SINTERED BEARING

(71) Applicant: NTN CORPORATION, Osaka (JP)

(72) Inventors: Yoshinori Ito, Aichi (JP); Yousuke Sugai, Aichi (JP)

(73) Assignee: NTN CORPORATION, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/129,258

(22) Filed: Sep. 12, 2018

(65) Prior Publication Data

US 2019/0010984 A1  Jan. 10, 2019

Related U.S. Application Data

(62) Division of application No. 14/435,533, filed as application No. PCT/JP2013/078686 on Oct. 23, 2013.

(30) Foreign Application Priority Data

Oct. 24, 2012 (JP) .................. 2012-234805
Mar. 1, 2013 (JP) .................. 2013-040712

(51) Int. Cl.
*F16C 33/10* (2006.01)
*C22C 38/00* (2006.01)
(Continued)

(52) U.S. Cl.
CPC .......... *F16C 33/104* (2013.01); *B22F 1/0059* (2013.01); *B22F 1/025* (2013.01);
(Continued)

(58) Field of Classification Search
CPC .... B22F 1/0059; B22F 1/025; B22F 2207/07; B22F 2999/00; B22F 3/10; B22F 5/10;
(Continued)

(56) References Cited

U.S. PATENT DOCUMENTS 5,943,214 A * 8/1999 Sato .................. G08B 6/00
248/638
10,536,048 B2 * 1/2020 Ito .................... B22F 5/10
(Continued)

FOREIGN PATENT DOCUMENTS

EP  2 231 353       9/2010
GB  1595346 A * 8/1981 ......... C22C 33/0207
(Continued)

OTHER PUBLICATIONS

International Search Report dated Dec. 17, 2013 in International (PCT) Application No. PCT/JP2013/078686.
(Continued)

*Primary Examiner* — Jenny R Wu
(74) *Attorney, Agent, or Firm* — Wenderoth, Lind & Ponack, L.L.P.

(57) ABSTRACT

There is provided a sintered bearing having high rotational accuracy and low rotational fluctuation. This bearing includes a bearing surface (4a), and is made of a sintered compact (4") produced by molding and sintering a raw material powder (10) containing a partially diffusion-alloyed powder (11) in which a copper powder (13) is partially diffused on a surface of an iron powder (12), a tin powder (14) as a low-melting-point metal powder, and a graphite powder as a solid lubricant powder. The sintered bearing has a radial crushing strength greater than or equal to 300 MPa.

10 Claims, 5 Drawing Sheets

(51) Int. Cl.
*F16C 33/12* (2006.01)
*C22C 38/16* (2006.01)
*F16C 33/14* (2006.01)
*B22F 5/10* (2006.01)
*B22F 1/00* (2022.01)
*B22F 1/02* (2006.01)
*F16C 17/02* (2006.01)
*B22F 3/10* (2006.01)

(52) U.S. Cl.
CPC .............. *B22F 5/10* (2013.01); *C22C 38/00* (2013.01); *C22C 38/008* (2013.01); *C22C 38/16* (2013.01); *F16C 33/121* (2013.01); *F16C 33/128* (2013.01); *F16C 33/145* (2013.01); *B22F 3/10* (2013.01); *B22F 2999/00* (2013.01); *F16C 17/02* (2013.01); *F16C 2204/10* (2013.01); *F16C 2204/60* (2013.01)

(58) Field of Classification Search
CPC ....... C22C 38/00; C22C 38/008; C22C 38/16; F16C 17/02; F16C 2204/10; F16C 2204/60; F16C 33/104; F16C 33/121; F16C 33/128; F16C 33/145
See application file for complete search history.

(56) References Cited

U.S. PATENT DOCUMENTS

| | | | |
|---|---|---|---|
| 2005/0063856 A1* | 3/2005 | Miyasaka | F16C 33/145 419/1 |
| 2007/0242911 A1 | 10/2007 | Nakagawa et al. | |
| 2010/0054982 A1* | 3/2010 | Larsson | B22F 1/025 419/36 |
| 2011/0000457 A1 | 1/2011 | Donaldson et al. | |
| 2012/0027635 A1 | 2/2012 | Takezaki et al. | |
| 2012/0177528 A1 | 7/2012 | Takayama | |
| 2016/0301279 A1* | 10/2016 | Ito | F16C 33/128 |
| 2019/0257356 A1* | 8/2019 | Ito | C22C 33/0207 |

FOREIGN PATENT DOCUMENTS

| | | |
|---|---|---|
| GB | 2 216 545 | 10/1989 |
| GB | 2 220 421 | 1/1990 |
| GB | 2 333 779 | 8/1999 |
| JP | 1-225749 | 9/1989 |
| JP | 0892604 A * | 4/1996 |
| JP | 10-96001 | 4/1998 |
| JP | 2001-123253 | 5/2001 |
| JP | 2002-173704 | 6/2002 |
| JP | 2002349575 A * | 12/2002 |
| JP | 2004-149708 | 5/2004 |
| JP | 3613569 | 1/2005 |
| JP | 4048758 B2 * | 2/2008 |
| JP | 2009-155696 | 7/2009 |
| JP | 2010-71350 | 4/2010 |
| JP | 2010-77474 | 4/2010 |
| JP | 2010-514935 | 5/2010 |
| JP | 2011-94167 | 5/2011 |
| JP | 2012-31965 | 2/2012 |
| WO | 2006/080554 | 8/2006 |
| WO | 2009/088771 | 7/2009 |

OTHER PUBLICATIONS

International Preliminary Report on Patentability and Written Opinion of the International Searching Authority dated Apr. 28, 2015 in International (PCT) Application No. PCT/JP2013/078686.
Extended European Search Report dated Jun. 16, 2016 in corresponding European Patent Application No. 13849722.7.
S. Shanmugam et al., "Ring rupture strength and hardness of sintered hot-forged 1.5Mo alloyed carbon steels", Journal of Materials Processing Technology 209 (2009), pp. 3426-3430, XP026076675.
European Patent Office Communication pursuant to Article 94(3) EPC dated Jul. 20, 2017 in counterpart European Application No. 13849722.7.
ASTM Standards: "Standard Test Method for Radial Crushing Strength, K, of Powder Metallurgy (P/M) Bearings and Structural Materials", pp. 1-3, Nov. 30, 2005.

* cited by examiner

SINTERED BEARING

TECHNICAL FIELD

The present invention relates to a sintered bearing.

BACKGROUND ART

A sintered bearing is a porous body having innumerable inner pores, which are usually impregnated with a lubricating fluid (e.g., a lubricating oil) during use. Under such a condition, when the sintered bearing rotates relative to a shaft inserted inside the inner periphery of the sintered bearing, the lubricating oil retained in the inner pores of the sintered bearing seeps onto an inner peripheral surface (bearing surface) of the sintered bearing with a rise in temperature. The seeped lubricating oil forms an oil film in a bearing gap between the bearing surface of the sintered bearing and an outer peripheral surface of the shaft, and thus the shaft is relatively rotatably supported.

For example, Patent Document 1 listed below describes a copper-iron-based sintered bearing that is composed primarily of iron and copper, and which is produced by compacting and sintering a copper-coated iron powder, in which an iron powder is coated with copper in an amount of greater than or equal to 10 mass % and less than 30 mass %, and the granularity is less than or equal to 80 mesh.

PRIOR ART DOCUMENT

Patent Document

Patent Document 1: Japanese Patent No. 3613569

SUMMARY OF THE INVENTION

Problems to be Solved by the Invention

However, the present inventors have conducted a verification work and revealed that, when the technical means of Patent Document 1 is applied to a sintered bearing, and the sintered bearing is used in a vibrating motor, large rotational fluctuation occurs. This seems to be attributed to rapid wear of the bearing surface due to a low neck strength between an iron phase (iron structure) and a copper phase (copper structure) in a sintered bearing that is produced by compacting and sintering a copper-coated iron powder.

In view of these circumstances, an object of the present invention is to provide a sintered bearing having high rotational accuracy and low rotational fluctuation.

Solutions to the Problems

The above-mentioned vibrating motor functions, for example, as a vibrator for providing an incoming call notification, an e-mail reception notification, and the like in a mobile terminal such as a mobile phone. Such vibrating motor is usually adapted to vibrate an entire mobile terminal by rotating, by a motor unit M, a weight (eccentric weight) W attached to one end of a shaft 3 as shown in FIG. 1. In recent years, use of a sintered bearing, which is compact in size and operates highly quietly, as a bearing to support a vibrating motor (the main shaft thereof) has been studied. FIG. 1 conceptually illustrates a main portion of a vibrating motor 1 in which sintered bearings 4 (41 and 42) are used. In this example illustration, the sintered bearings 4 (41 and 42) each having a cylindrical shape rotatably support the shaft 3, on both sides thereof, which protrudes from both sides of the motor unit M in the axial direction. The sintered bearing 41 on the weight W side is disposed between the weight W and the motor unit M. The sintered bearing 41 on the weight W side is formed to have a greater thickness and a larger diameter than the sintered bearing 42 disposed on the opposite side from the weight W. Each of the two sintered bearings 4 (41 and 42) has a bearing surface 4a on the inner periphery thereof, and is secured, for example, by a technique such as press fitting, to the inner periphery of a housing 2 formed of a metal material.

When the shaft 3 rotates in this vibrating motor 1, the shaft 3 rotates with run-out thereof against the entire bearing surfaces 4a under the influence of the weight W. That is, in a sintered bearing for normal use, the shaft 3 rotates eccentrically in the direction of gravity, while, in the sintered bearings 4 (41 and 42) for a vibrating motor, the shaft 3 rotates with the shaft center Oa eccentric not only in the direction of gravity but in all directions with respect to the bearing center Ob as shown in FIG. 2.

In recent years, in consideration of the use in a "smart phone" etc., there has been a demand for further reduction in size of a vibrating motor. Size reduction of a vibrating motor imposes a limitation on increasing motor power. Efforts have been directed at ensuring predetermined vibration performance even in such conditions by rotating a motor at a higher speed (at or above 10000 rpm), or by increasing an unbalanced load of the weight W, leading to a tendency toward more stringent usage conditions of the sintered bearings 4 for a vibrating motor.

In the study of such sintered bearing for a vibrating motor, the present inventors have found that this type of bearing undergoes run-out of the shaft against the entire bearing surface during high-speed rotation, and frequent hitting of the bearing surface by the shaft (i.e., frequent sliding contact with the bearing surface by the shaft) due to the unbalanced load, thereby causing the bearing surface to more easily wear than that of a sintered bearing for normal use. The present inventors have also found that accuracy of the bearing surface is important for ensuring the rotational accuracy, and furthermore, that merely improving the accuracy of the bearing surface is not sufficient, and the rotational accuracy of the shaft is also affected by deformation of the bearing surface to the shape of the inner peripheral surface of the housing when the sintered bearing is press-fitted in the inner periphery of the housing.

A sintered bearing of the present invention has been created based on the finding described above. More specifically, a sintered bearing of the present invention is a sintered bearing having, in an inner periphery, a bearing surface that forms a bearing gap between the bearing surface and a shaft to be supported, and is characterized in that the sintered bearing is made of a sintered compact produced by molding and sintering a raw material powder containing a partially diffusion-alloyed powder in which a copper powder is partially diffused in an iron powder, a low-melting-point metal powder, and a solid lubricant powder, and that the sintered bearing has a radial crushing strength greater than or equal to 300 MPa.

Since a part of the copper powder is diffused in the iron powder in the partially diffusion-alloyed powder, a higher neck strength than that of a case where a copper-coated iron powder is used is achieved between an iron structure and a copper structure after sintering. In addition, according to the configuration described above, sintering after molding (compression molding) of the raw material powder causes melting of the low-melting-point metal powder contained in the green compact. Since a low-melting-point metal has high wettability to copper, liquid phase sintering can firmly bond together an iron phase and a copper phase and/or copper phases in grains adjacent to each other in the partially diffusion-alloyed powder. Moreover, the molten low-melting-point metal is diffused into a region where a part of the copper powder is diffused on a surface of the iron powder to form a Fe—Cu alloy in each grain of the partially diffusion-alloyed powder, and this enables a still higher neck strength between an iron phase and a copper phase. As such, low temperature sintering can also produce a high-strength sintered compact (sintered bearing) having high wear resistance of the bearing surface and a radial crushing strength greater than or equal to 300 MPa.

As described above, improvement of wear resistance of the bearing surface can prevent rotational fluctuation. If a sintered bearing (sintered compact) does not have sufficient radial crushing strength, and thus when press-fitting of the sintered bearing into the housing inner periphery causes a deformation of the bearing surface, and accuracy (among others, circularity and/or cylindricity) of the bearing surface is reduced, shape correction processing (e.g., sizing) needs to be additionally performed to finish the bearing surface in an appropriate shape. Moreover, if a sintered bearing (sintered compact) does not have sufficient radial crushing strength, then the bearing surface may be deformed when an impact load is applied to a product (e.g., a mobile phone) incorporating that sintered bearing by, for example, dropping the product. On the other hand, if the sintered compact has a radial crushing strength greater than or equal to 300 MPa, then the above-mentioned problems can be prevented from occurring to the extent possible. Thus, a sintered bearing that achieves both high durability and high rotational accuracy can be provided at low cost.

In order to obtain the sintered bearing (sintered compact) described above, it is preferable to use, as the partially diffusion-alloyed powder contained in the raw material powder, a partially diffusion-alloyed powder in which a copper powder having an average grain size greater than or equal to 5 µm and less than 20 µm is partially diffused on a surface of the iron powder, and the partially diffusion-alloyed powder contains 10 to 30 mass % of Cu.

The present inventors have conducted an extensive study and found that, if a partially diffusion-alloyed powder having large grain sizes of an average grain size greater than 106 µm is contained in the raw material powder, then coarse pores are likely to be formed inside the sintered compact, and thus, required wear resistance of the bearing surface, radial crushing strength, and/or the like may not be ensured. Thus, it is preferable to use a partially diffusion-alloyed powder having an average granularity less than or equal to 145 mesh (i.e., an average grain size less than or equal to 106 µm). Use of such alloy powder results in a uniform metal structure (porous structure) after sintering, thereby allowing a sintered compact to be stably obtained in which development of coarse pores in the metal structure is reduced. Thus, a sintered bearing having even higher wear resistance of the bearing surface and even higher radial crushing strength of the bearing can be stably obtained.

In this sintered bearing, a tin powder may be used as the low-melting-point metal powder, and a graphite powder may be used as the solid lubricant powder. In such case, the sintered compact contains 10 to 30 mass % of Cu, 0.5 to 3.0 mass % of Sn, and 0.3 to 1.5 mass % of C, with the balance iron and inevitable impurities. In this configuration, initial conformability of the bearing surface is improved and a quieter operation can be achieved since a certain amount of copper is contained in a metal structure in the sintered compact. Moreover, this sintered bearing is composed mainly of iron (iron structure), and therefore has high mechanical strength. Furthermore, costly materials such as nickel (Ni) and molybdenum (Mo) are not used. Accordingly, a sintered bearing having improved mechanical strength and improved wear resistance of the bearing surface can be provided at low cost.

When the iron structure in the sintered compact is composed primarily of a soft ferrite phase, aggressiveness of the bearing surface to the shaft can be weakened, and thus wear of the shaft can be reduced. An iron structure composed primarily of a ferrite phase can be obtained, for example, by firing a green compact at a temperature at or below 900° C., at which iron and carbon do not react with each other.

An iron structure composed primarily of a ferrite phase includes a structure composed entirely of a ferrite phase, and also an iron structure containing a pearlite phase, which is harder than a ferrite phase, at a grain boundary of the ferrite phase. Forming a pearlite phase at a grain boundary of the ferrite phase as described above can improve wear resistance of the bearing surface as compared to an iron structure composed only of a ferrite phase. In order to achieve both a reduction in wear of the shaft and an improvement in wear resistance of the bearing surface, it is preferable that the content ratios of the ferrite phase (α-Fe) and of the pearlite phase (γ-Fe) in the iron structure be respectively 80 to 95% and 5 to 20% (α-Fe: γ-Fe=80 to 95%: 5 to 20%). The content ratios described above can be obtained, for example, as respective ratios of the areas of the ferrite phase and of the pearlite phase on an arbitrary cross section of the sintered compact.

A reduced iron powder may be used as the iron powder contained in the partially diffusion-alloyed powder (Fe—Cu partially diffusion-alloyed powder). In addition to the reduced iron powder, for example, an atomized iron powder may also be used as the iron powder. However, due to a sponge-like structure (porous structure) having inner pores, a reduced iron powder is softer, and thus exhibits a higher degree of compression moldability, than an atomized iron powder. This can improve the strength of the green compact even in a low density, and thus chipping and cracking of the green compact can be prevented. Due to the sponge-like structure described above, a reduced iron powder also provides an advantage in higher oil retentivity than an atomized iron powder.

In the configuration described above, it is preferable that the porosity of a surface layer region, in particular, the porosity of a surface layer region including the bearing surface, be from 5 to 20%. As used herein, a surface layer region refers to a region from the surface to a depth of 100 µm.

The sintered compact (the inner pores thereof) may be impregnated with a lubricating oil. A lubricating oil used preferably has a kinematic viscosity in a range from 10 to 50 mm$^2$/s at a temperature of 40° C. This is to reduce an increase in rotation torque while ensuring stiffness of the oil film formed in the bearing gap. Note that the oil impregnated into the sintered compact may be a liquid grease that employs, as a base oil, an oil (lubricating oil) having a kinematic viscosity in a range from 10 to 50 mm$^2$/s at a temperature of 40° C.

Effects of the Invention

As described above, the present invention can provide a sintered bearing having high rotational accuracy and low rotational fluctuation. Due to such properties, this sintered bearing is particularly suitable for supporting the main shaft of a vibrating motor.

EMBODIMENT OF THE INVENTION

An embodiment of the present invention will be described below with reference to the drawings.

Figure 1:
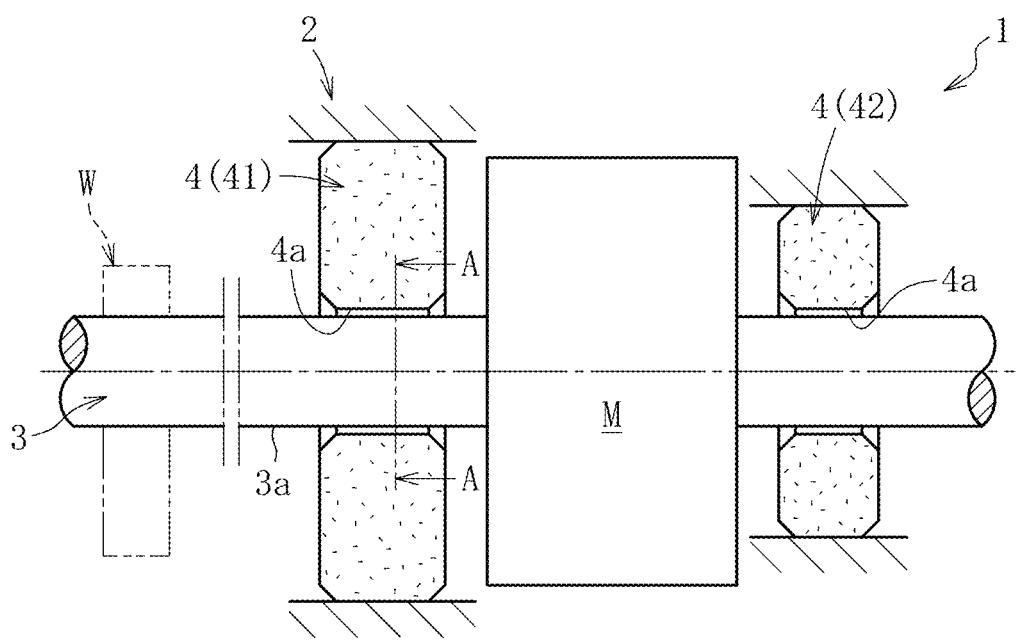
FIG. 1 is a schematic cross-sectional view of a main portion of a vibrating motor including a sintered bearing according to an embodiment of the present invention.
Figure 2:
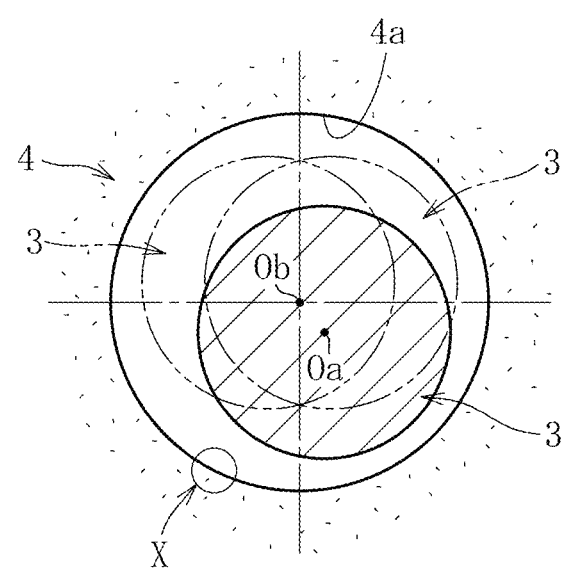
FIG. 2 is a cross-sectional view taken along line A-A shown in FIG. 1.

Referring to FIG. 1, a main portion of a vibrating motor 1 including sintered bearings 4 according to an embodiment of the present invention will be described. In this vibrating motor 1, a shaft 3 having a diameter less than or equal to 2 mm (e.g., 0.6 mm) is driven by a motor unit M to rotate at a rotational speed greater than or equal to 10000 rpm. The vibrating motor 1 includes a housing 2 made of metal or resin, formed in a generally cylindrical shape; sintered bearings 4 (41 and 42) each having a ring shape, disposed on both sides in the axial direction of the motor unit M, and secured to an inner periphery of the housing 2 by press-fitting; and the shaft 3 inserted inside the inner peripheries of the sintered bearings (41 and 42). The gap width of a gap (bearing gap) formed between the shaft 3 and a bearing surface 4a of each of the sintered bearings 4 is determined to be about 4 μm on one side (radius-value). The shaft 3 is formed of stainless steel or the like, and a weight W is provided integrally or separately on one end thereof. The weight W of this embodiment is attached and secured to one end of the shaft 3 so that the center of the weight W is eccentric to the center of the shaft 3. Inner pores of the sintered bearings 4 are impregnated with a lubricating oil having a kinematic viscosity in a range from 10 to 50 $mm^2/s$ at a temperature of 40° C., or with a liquid grease that employs, as a base oil, an oil having a kinematic viscosity in a range from 10 to 50 $mm^2/s$ at a temperature of 40° C.

In a bearing unit 1 having the configuration described above, when the shaft 3 rotates relative to the sintered bearings 4, the lubricating oil retained in the inner pores of the sintered bearings 4 seeps onto the bearing surfaces 4a with a rise in temperature. The seeped lubricating oil forms an oil film in the bearing gap between an outer peripheral surface 3a of the shaft 3 and the bearing surface 4a of each of the sintered bearings 4, which face each other, and thus the shaft 3 is relatively rotatably supported by the sintered bearings 4.

Note that, although not shown, the bearing unit 1 may include a seal member that seals an opening of the housing 2 for preventing the lubricating oil impregnated into the inner pores of the sintered bearings 4 from leaking or splashing out of the housing 2.

The sintered bearings 4 described above are manufactured mainly through (A) a raw material powder preparation step, (B) a compaction step, and (C) a sintering step, sequentially. The steps (A) to (C) are described below in detail. The two sintered bearings 4 (41 and 42) disposed on both sides of the motor unit M differ from each other only in the dimension along the axial direction (i.e., areas of the bearing surfaces 4a) and in the thickness along the radial direction, and the other arrangements of configuration are substantially identical. Thus, these two sintered bearings 4 (41 and 42) are manufactured using the same manufacturing process.

(A) Raw Material Powder Preparation Step

In this step, the raw material powder, which is a material for manufacturing the sintered bearings 4, is prepared by mixing a plurality of powders described below. The raw material powder used in this embodiment is a blended powder containing primarily a partially diffusion-alloyed powder, with a low-melting-point metal powder and a solid lubricant powder blended therewith. Various molding aids (e.g., a lubricant for improving mold release properties) may be added to this raw material powder as needed. Each of the powders mentioned above will be described below in detail.

[Partially Diffusion-Alloyed Powder]

Figure 4:
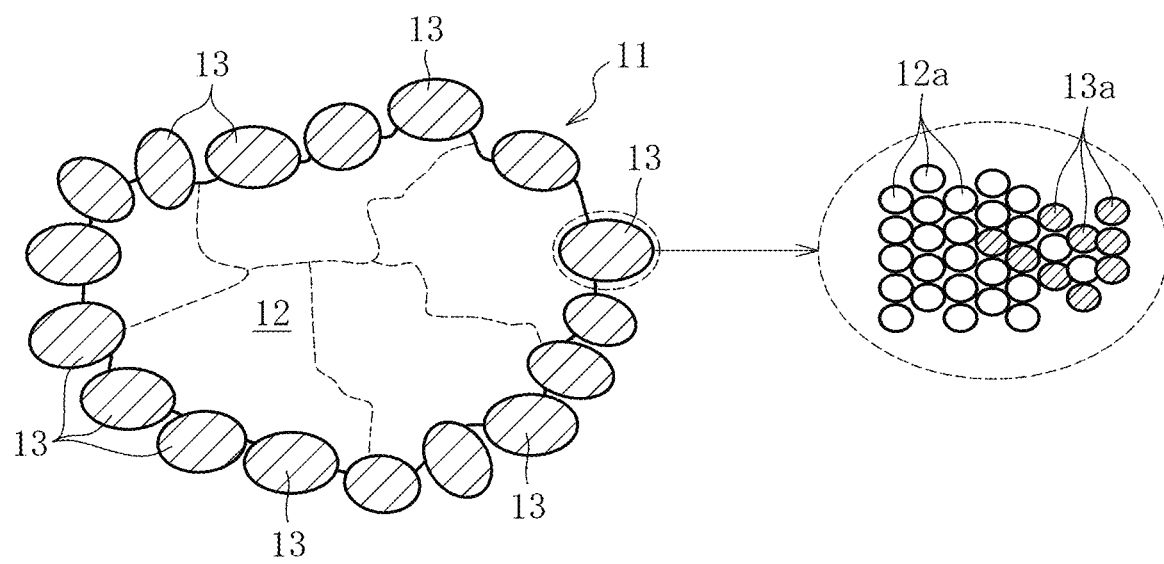
FIG. 4 is a diagram schematically illustrating a partially diffusion-alloyed powder.

A Fe—Cu partially diffusion-alloyed powder in which a copper powder 13 is partially diffused on a surface of an iron powder 12 is used as a partially diffusion-alloyed powder 11. In particular, this embodiment employs a Fe—Cu partially diffusion-alloyed powder in which many grains of the copper powder 13 having an average grain size smaller than that of the iron powder 12 are partially diffused on a surface of the iron powder 12 as schematically shown in FIG. 4. A Fe—Cu alloy is formed in a diffusion region of the partially diffusion-alloyed powder 11. As shown in the enlarged partial view of FIG. 4, each alloyed portion has a crystal structure in which an iron atom 12a and a copper atom 13a are bonded to each other in alignment. As the partially diffusion-alloyed powder 11, only grains that will pass through a sieve mesh having a mesh size of 145 mesh, that is, grains having an average granularity less than or equal to 145 mesh (average grain size less than or equal to 106 μm) are used. Meanwhile, a grain having a smaller grain size is lighter in weight, and is more likely to suspend. Therefore, a raw material powder containing a partially diffusion-alloyed powder 11 having a high content of small-sized grains will have poorer filling properties for a mold (cavity) in the compaction step described below, making it difficult to stably obtain a green compact having a predetermined shape and density. More specifically, the present inventors have found that the above-mentioned problem is more likely to occur when the partially diffusion-alloyed powder 11 contains 25 mass % or more grains having a grain size less than or equal to 45 μm. Therefore, it is preferable to selectively use a partially diffusion-alloyed powder 11 having an average granularity less than or equal to 145 mesh (average grain size less than or equal to 106 μm), and containing less than 25 mass % of grains having an average granularity less than or equal to 350 mesh (average grain size less than or equal to 45 μm). An average grain size can be measured using a laser diffraction scattering method (e.g., using SAID 31000 manufactured by Shimadzu Corporation), in which laser light is emitted to a group of grains, and based on the intensity distribution profile of the diffracted/scattered light emitted therefrom, grain size distribution and then the average grain size are calculated.

A publicly-known powder, such as a reduced iron powder or an atomized iron powder, may be used as the iron powder 12 contained in the partially diffusion-alloyed powder 11 described above. In this embodiment, a reduced iron powder is used. The reduced iron powder is composed of grains each having an irregular shape that is nearly spherical, and has a sponge-like structure (porous structure) having inner pores, and thus is also called a sponge iron powder. An iron powder having an average grain size from 20 μm to 106 μm is preferred, and one having an average grain size from 38 μm to 75 μm is more preferred, as the iron powder 12 used.

As the copper powder 13 contained in the partially diffusion-alloyed powder 11, a widely-used copper powder that is composed of grains each having an irregular or dendritic shape can be widely used. For example, an electrolytic copper powder, an atomized copper powder, or the like is used. This embodiment employs an atomized copper powder composed of grains having numerous irregularities on the surfaces, and each having an irregular shape that is nearly spherical, and having good moldability. The copper powder 13 used has a smaller grain size than that of the iron powder 12, and more specifically, has an average grain size greater than or equal to 5 μm and less than or equal to 20 μm (preferably less than 20 μm). The content ratio of Cu in each grain of the partially diffusion-alloyed powder 11 is 10 to 30 mass % (preferably 22 to 26 mass %), and is the same as the content of copper in a sintered compact 4" obtained by the sintering step (more strictly, the content of copper on the assumption that the sintered compact 4" does not contain Sn or C). That is, in this embodiment, the raw material powder is blended with no single-component copper powder or single-component iron powder. Although the raw material powder may, in fact, be blended with a single-component copper powder or a single-component iron powder, blending a single-component copper powder makes it difficult to improve the strength of the bearing surfaces 4a, thereby facilitating formation of an indentation (recess) on the bearing surface 4a, for example, when the shaft 3 hits the bearing surface 4a during rotation. On the other hand, blending a single-component iron powder makes it difficult to obtain a sintered compact 4" (sintered bearings 4) having a desired radial crushing strength. Accordingly, it is preferable that no single-component copper powder or single-component iron powder be blended with the raw material powder.

[Low-Melting-Point Metal Powder]

A metal powder having a melting point at or below 700° C., such as a powder of, for example, tin, zinc, phosphorus, or the like, is used as the low-melting-point metal powder. This embodiment employs a tin powder 14 among others, which only slightly evaporates during sintering (see FIG. 6), in particular, an atomized tin powder. A tin powder having an average grain size from 5 to 63 μm is preferably used, and one having an average grain size from 20 to 45 μm is more preferably used, as the tin powder (atomized tin powder) 14.

[Solid Lubricant]

One or more powders, such as those of graphite, molybdenum disulfide, and zinc stearate, can be used as the solid lubricant. Taking cost into consideration, this embodiment employs a graphite powder, in particular, a flake graphite powder.

(B) Compaction Step

Figure 5A:
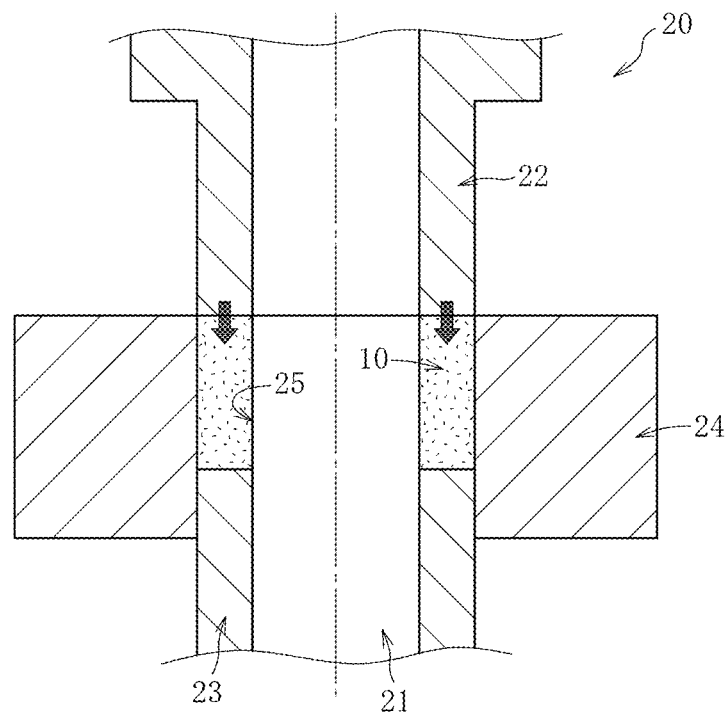
FIG. 5(a) is a schematic cross-sectional view for describing a compaction step.
Figure 5B:
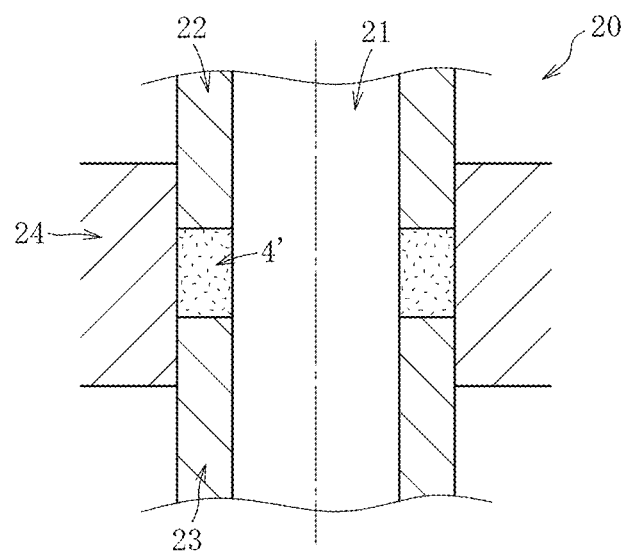
FIG. 5(b) is a schematic cross-sectional view for describing a compaction step.

In the compaction step, a green compact 4' having a shape approximating that of the sintered bearings 4 shown in FIG. 1 etc. (a shape of a generally finished product) is obtained by compressing a raw material powder 10 described above, using a mold 20 such as one shown in FIGS. 5(a) and 5(b).

The mold 20 includes, as main components, a core 21, upper and lower punches 22 and 23, and a die 24 that are coaxially aligned. The mold 20 is placed, for example, in a die set of a cam-type molding press.

Figure 6:
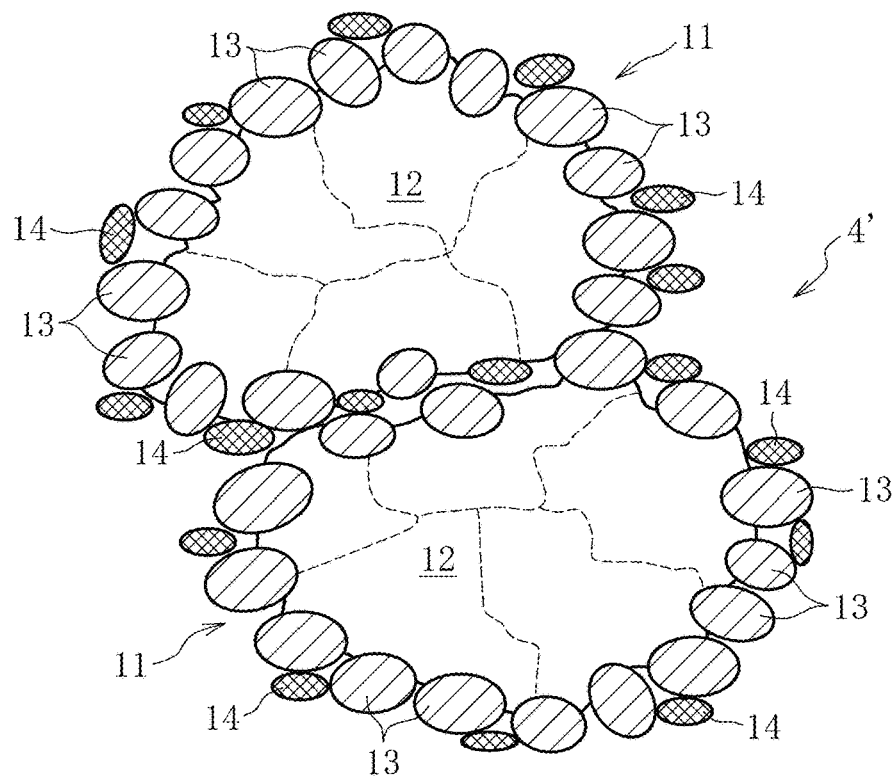
FIG. 6 is a diagram conceptually illustrating a part of a green compact.

In the mold 20 having the configuration described above, a cavity 25 defined by the core 21, the lower punch 23, and the die 24 is filled with the raw material powder 10, and the upper punch 22 is then relatively moved toward the lower punch 23 to compress the raw material powder 10 with an appropriate pressurization force (determined depending on the shape and the size of the green compact to be molded). Thus, the green compact 4' is molded. Thereafter, the upper punch 22 is moved upward, and also the lower punch 23 is moved upward, to discharge the green compact 4' out of the cavity 25. As schematically shown in FIG. 6, the partially diffusion-alloyed powder 11, the tin powder 14, and the graphite powder (not shown) are uniformly dispersed in the green compact 4'. Because of the use of the reduced iron powder as the iron powder 12, the partially diffusion-alloyed powder 11 used in this embodiment is softer, and thus exhibits a higher degree of compression moldability, than a partially diffusion-alloyed powder containing an atomized iron powder. This can improve the strength of the green compact 4' even in a low density, and thus chipping and cracking of the green compact 4' can be prevented.

(C) Sintering Step

In the sintering step, the green compact 4' is sintered to obtain a sintered compact. Sintering needs to be performed so as to prevent carbon contained in the graphite (graphite powder) from reacting with iron (i.e., so as not to allow carbon to diffuse). In equilibrium between iron and carbon, the transformation point is 723° C., above which temperature iron and carbon begin to react with each other to generate a pearlite phase (γ-Fe) in the iron structure. In contrast, in sintering, carbon (graphite) and iron begin to react with each other after a temperature of 900° C. is exceeded, and a pearlite phase (γ-Fe) is generated. Since a pearlite phase (γ-Fe) has a high hardness (HV greater than or equal to 300), and thus exhibits aggressiveness to a mating member, existence of an excess amount of a pearlite phase (γ-Fe) in the iron structure of the sintered bearings 4 may accelerate wear of the shaft 3. Moreover, in a typical manufacturing process of a sintered bearing, a green compact is often heated and sintered in an atmosphere of an endothermic gas (RX gas) generated by thermally decomposing a mixture of a liquefied petroleum gas, such as butane or propane, and air with a Ni catalyst. However, use of an endothermic gas may cause hardening of the surface of the green compact due to diffusion of carbon, and thus the above-mentioned problem becomes more likely to occur.

In view of the foregoing, the green compact 4' is heated at a temperature at or below 900° C., more specifically, at or above 700° C. (preferably 760° C.) and at or below 840° C. (low temperature sintering). The sintering atmosphere is a gas atmosphere (hydrogen gas, nitrogen gas, argon gas, or the like) containing no carbon, or vacuum. Such sintering conditions do not cause a reaction between carbon and iron in the raw material powder, and therefore the iron structure after sintering is composed entirely of soft ferrite phases (HV less than or equal to 200). If any molding aid, such as a fluid lubricant, is contained in the raw material powder, such molding aid volatilizes during sintering.

Figure 7:
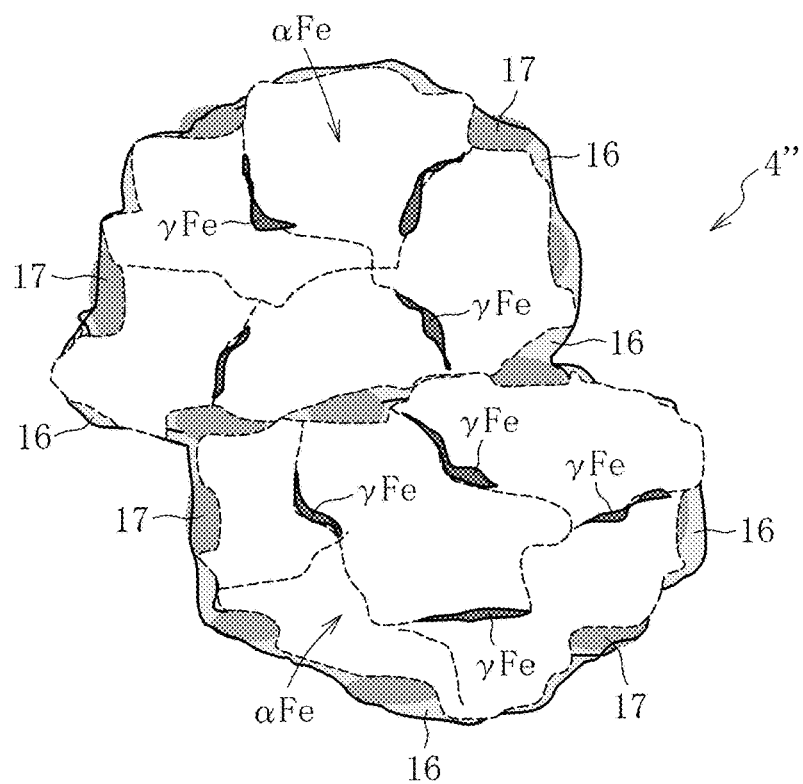
FIG. 7 is a diagram schematically illustrating a metal structure of a sintered compact.

The iron structure may entirely be formed of a ferrite phase (α-Fe), or may be a two-phase structure formed of a ferrite phase α-Fe and a pearlite phase γ-Fe as shown in FIG. 7. This allows the pearlite phases γ-Fe, harder than the ferrite phases α-Fe, to contribute to improving wear resistance of the bearing surface, thereby reducing wear of the bearing surface under a high surface pressure, and thus enabling the service life of the bearing to be extended. However, if the relative abundance of the pearlite phase γ-Fe is excessive, that is, comparable to that of the ferrite phase α-Fe, then aggressiveness of the pearlite to the shaft 3 intensify, accelerating wear of the shaft 3. In order to prevent this, pearlite phases γ-Fe are restricted to exist (scattered) only at a grain boundary of the ferrite phase α-Fe as shown in FIG. 7. As used herein, a "grain boundary" means both one formed at a boundary between powder grains, and a crystal grain boundary formed within a powder grain. If the iron structure is formed as a two-phase structure of a ferrite phase α-Fe and a pearlite phase γ-Fe, then the content ratios of the ferrite phase α-Fe and of the pearlite phase γ-Fe in the iron structure are preferably about 80 to 95% and about 5 to 20%, respectively (α-Fe: γ-Fe=80 to 95%: 5 to 20%) in terms of area ratios on an arbitrary cross section of the sintered compact. This can achieve both a reduction in wear of the shaft 3 and an improvement in wear resistance of the bearing surfaces 4a.

The growth rate of a pearlite phase γ-Fe mainly depends on the sintering temperature. Therefore, in order to place a pearlite phase γ-Fe at a grain boundary of the ferrite phase α-Fe in a manner described above, sintering is performed using a carbon-containing gas (e.g., a natural gas or an endothermic gas (RX gas)) as the furnace atmosphere at a sintering temperature increased to about 820° C. to 900° C. This causes carbon contained in the gas to diffuse into iron during sintering, and allows pearlite phases γ-Fe to be formed. Note that sintering the green compact 4' at a temperature above 900° C. causes carbon in the graphite powder to react with iron to form pearlite phases γ-Fe. Therefore, the green compact 4' is preferably sintered at or below 900° C.

After sintering, the sintered compact 4" is finished to a finished dimension and shape by sizing, and then inner pores of this sintered compact 4" are impregnated with a lubricating oil using a technique such as vacuum impregnation. Thus, the sintered bearings 4 shown in FIG. 1 are completed. The lubricating oil used for impregnating the inner pores of the sintered compact 4" is one having a low viscosity, more specifically, one having a kinematic viscosity from 10 to 50 $mm^2$/s at a temperature of 40° C. (e.g., synthetic hydrocarbon-based lubricating oil). This is to reduce an increase in rotation torque while ensuring stiffness of the oil film formed in the bearing gap. Note that the inner pores of the sintered compact 4" may be impregnated with a liquid grease that employs, as abase oil, a lubricating oil having a kinematic viscosity from 10 to 50 $mm^2$/s at a temperature of 40° C. In addition, it suffices to perform sizing as needed; sizing is not necessarily needed. Depending on the application, the impregnation process of the lubricating oil may be omitted, and the sintered bearings may be used without feeding any oil.

The sintered compact 4" (each of the sintered bearings 4) of this embodiment contains 10 to 30 mass % (preferably 22 to 26 mass %) of Cu, 0.5 to 3.0 mass % (preferably 1.0 to 3.0 mass %) of Sn, and 0.3 to 1.5 mass % (preferably 0.5 to 1.0 mass %) of C, with the balance iron and inevitable impurities. Under the sintering conditions described above, in which the green compact 4' is sintered at a temperature at or below 900° C., which is much lower than the melting point of copper (1083° C.), the copper powder 13 contained in the green compact 4' (i.e., contained in the partially diffusion-alloyed powder 11) does not melt, and thus copper does not diffuse into iron (iron structure) during sintering. Accordingly, an appropriate amount of the copper structure is exposed on a surface (bearing surface 4a) of this sintered compact 4". Free graphite is also exposed on the surface of the sintered compact 4". This can achieve the sintered bearings 4 that exhibit good initial conformability with the shaft 3, and have a low friction coefficient of the bearing surfaces 4a. An increase in the blend ratio of Sn would increase the mechanical strength of the sintered compact 4", but an excess amount of Sn would result in an increase in the number of coarse pores. Therefore, the blend ratio described above (blend ratio of about 10% of that of Cu) is used.

An iron structure composed primarily of iron and a copper structure composed primarily of copper are formed in the sintered compact 4". In this embodiment, since no single-component iron powder or single-component copper powder is added to the raw material powder (if any, the amount added is very small), all the iron structures and the copper structures of the sintered compact 4" are formed primarily of the partially diffusion-alloyed powder 11. Since a partially diffusion-alloyed powder has a structure in which a part of a copper powder is diffused in an iron powder, a high neck strength can be achieved between an iron structure and a copper structure after sintering. In addition, the tin powder 14 in the green compact 4' melts during sintering, and then wets the surface of the copper powder 13 contained in the partially diffusion-alloyed powder 11. This causes liquid phase sintering to proceed between tin (Sn) and copper (Cu), thereby forming a bronze phase (α-Cu—Sn) 16 that bonds together an iron structure and a copper structure, or copper structures, in grains adjacent to each other in the partially diffusion-alloyed powder 11 as shown in FIG. 7. Moreover, the molten Sn is diffused in a region where a part of the copper powder 13 is diffused on the surface of the iron powder 12 to form a Fe—Cu alloy, thereby forming a Fe—Cu—Sn alloy (alloy phase) 17 in each grain of the partially diffusion-alloyed powder 11. This enables a still higher neck strength between an iron phase and a copper phase. As such, low temperature sintering described above can also achieve high radial crushing strength, more specifically, a radial crushing strength greater than or equal to 300 MPa, and can also harden the bearing surfaces 4a to improve wear resistance of the bearing surfaces 4a. In FIG. 7, a ferrite phase α-Fe, a pearlite phase γ-Fe, and the like are indicated by different levels of shading. More specifically, the order of increasing level of shading is as follows: ferrite phase α-Fe→bronze phase 16→Fe—Cu—Sn alloy (alloy phase) 17→pearlite phase γ-Fe.

The use of a powder having an average granularity less than or equal to 145 mesh (average grain size less than or equal to 106 μm) as the partially diffusion-alloyed powder 11 allows the porous structure of the sintered compact 4" to be uniform, and thus can prevent generation of coarse pores. This can increase the density of the sintered compact 4", thereby to further improve the radial crushing strength and the wear resistance of the bearing surfaces 4a.

As described above, the sintered compact 4" of this embodiment has a radial crushing strength greater than or equal to 300 MPa. This value of radial crushing strength is twice or more that of a conventional copper-iron-based sintered compact. In addition, the sintered compact 4" of this embodiment has a density of 6.8±0.3 $g/cm^3$, which is higher than the density of a conventional iron-copper-based sintered compact (about 6.6 $g/cm^3$). A conventional iron-copper-based sintered compact may also have an increased density through high compression in the molding step of the green compact. However, such a process prevents an internal fluid lubricant from burning, and thus gasifies the fluid lubricant during sintering. This results in coarser pores in the surface layer region. The present invention eliminates the need for high compression in molding the green compact, and therefore can prevent such problem.

Besides an increase in the density of the sintered compact 4'' as described above, an oil content greater than or equal to 15 vol % can be achieved, and thus an oil content comparable with that of a conventional iron-copper-based sintered bearing can be achieved. This is mainly because a reduced iron powder having a sponge-like structure and good oil retentivity is used as the iron powder 12 contained in the partially diffusion-alloyed powder 11. In this case, the lubricating oil impregnated into the sintered compact 4'' is retained not only in pores formed between grains of a sintered structure, but also in pores included in the reduced iron powder.

Coarse pores are likely to occur particularly in a surface layer region (a region from the surface to a depth of 100 μm of the sintered compact) of the sintered compact 4''. However, as far as the sintered compact 4'' obtained as described above is concerned, the density of the surface layer region can be increased by preventing generation of coarse pores in the surface layer region as described above. More specifically, the porosity of 5 to 20% can be achieved in the surface layer region. This porosity can be obtained, for example, by performing image analysis on the area ratio of pore regions on an arbitrary cross section of the sintered compact 4''.

An increase in the density of the surface layer region as described above, at the same time, reduces the surface porosity of the bearing surfaces 4a. More specifically, the surface porosity of the bearing surfaces 4a can be limited to a range greater than or equal to 5% and less than or equal to 20%. Note that a surface porosity less than 5% causes difficulties in allowing a necessary and sufficient amount of lubricating oil to seep into the bearing gap (results in insufficient ability to form an oil film), and thus no longer provides a benefit as a sintered bearing.

Moreover, the raw material powder for producing this sintered compact 4'' is formed primarily of the partially diffusion-alloyed powder 11, in which the copper powder 13 is partially diffused on the surface of the iron powder 12. Therefore, copper segregation can be prevented, which poses a problem in a conventional iron-copper-based sintered bearing. This sintered compact 4'' can also improve the mechanical strength without using a powder of a costly metal such as Ni or Mo, thereby achieving cost reduction of the sintered bearings 4.

As has been discussed above, since the sintered bearings 4 according to the present invention have a high radial crushing strength (radial crushing strength greater than or equal to 300 MPa), the bearing surfaces 4a will not deform to the shape of the inner peripheral surface of the housing 2 even when secured to an inner periphery of the housing 2 by press-fitting as shown in FIG. 1, and can thus maintain the circularity, the cylindricity, and the like of the bearing surfaces 4a even after attachment. Thus, a desired circularity (e.g., a circularity less than or equal to 3 μm) can be achieved without additionally performing a process (e.g., sizing) for finishing the bearing surfaces 4a to each have an appropriate shape and an appropriate level of accuracy after the sintered bearings 4 are secured to an inner periphery of the housing 2 by press-fitting. Moreover, since the sintered bearings 4 have a radial crushing strength greater than or equal to 300 MPa, deformation of the bearing surfaces 4a can be prevented to the extent possible even when a large impact load is applied to the bearing surfaces 4a, for example, as a result of dropping the vibrating motor 1 incorporating this sintered bearings 4 (hence, a mobile terminal etc. that incorporates this vibrating motor 1). Furthermore, due to high wear resistance provided by an increase in the hardness of the bearing surfaces 4a, wear and/or damage of the bearing surfaces 4a is reduced even when run-out of the shaft 3 against the entire bearing surfaces 4a is generated, or the shaft 3 frequently hits the bearing surfaces 4a. Thus, the present invention can provide the sintered bearings 4 suitable for supporting a vibrating motor at low cost.

Figure 3:
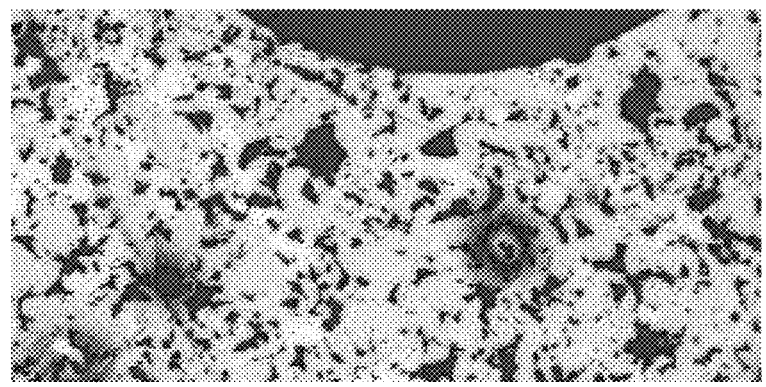
FIG. 3 shows a micrograph of the part X in FIG. 2.
Figure 8:
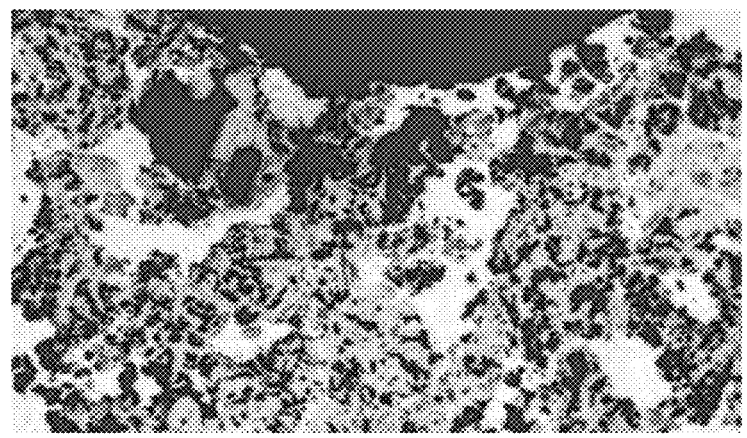
FIG. 8 shows a micrograph of a portion near a bearing surface of a conventional sintered bearing.

Here, for reference purposes, a micrograph of a surface layer region of a sintered bearing according to the technical means described in Patent Document 1 (hereinafter referred to as "copper-coated iron powder bearing") is illustrated in FIG. 8. Comparing FIG. 8 and with micrograph of a surface layer region of the sintered bearings 4 according to this embodiment (see FIG. 3), the sintered bearings 4 according to this embodiment have a more uniform and denser porous structure in a surface layer region than the copper-coated iron powder bearing. Indeed, the porosity of the surface layer region according to this embodiment is 13.6%, while the porosity of the surface layer region of the copper-coated iron powder bearing is about 25.5%. One of the factors in creating such difference is insufficient neck strength between iron phases and copper phases, because only copper films are in tight contact with the iron powder in the copper-coated iron powder.

A description has been presented in terms of sintered bearings according to one embodiment of the present invention. However, embodiments of the present invention are not limited to the one described above.

For example, compression molding of the green compact 4' may be carried out by what is called a warm molding method, in which the green compact 4' undergoes compression molding while at least one of the mold 20 and the raw material powder 10 is heated, or a mold lubrication molding method, in which the green compact 4' undergoes compression molding with a lubricant applied to the molding surface of the mold 20 (defining surface of the cavity 25). These methods enable the green compact 4' to be molded more accurately.

The sintered bearings 4 according to the present invention are not only used in a vibrating motor, but can each be widely used as a bearing that rotatably supports a shaft, including a shaft supporting application for a high-speed motor having a high unbalanced load. Although this embodiment has been described on the assumption that the shaft 3 rotates, the sintered bearings 4 can also be used in an application in which, in contrast, the bearings 4 rotate. The bearing surfaces 4a of the sintered bearings 4 may each be provided with a dynamic pressure generation portion, such as a dynamic pressure groove. This configuration can increase stiffness of the oil film formed in the bearing gap, and thus can further improve the rotational accuracy.

The invention claimed is:

1. A process for manufacturing a sintered bearing having, in an inner periphery, a bearing surface that forms a bearing gap between the bearing surface and a shaft to be supported, wherein the sintered bearing has a radial crushing strength greater than or equal to 300 MPa, and wherein the sintered bearing has a surface layer region with an area ratio having a porosity of from 5 to 20%, the process comprising the steps of:

molding a raw material powder containing a partially diffusion-alloyed powder in which a plurality of grains of a copper powder are partially diffused in an iron powder, a tin powder, and a solid lubricant powder, the partially diffusion-alloyed powder having a Fe—Cu alloy formed at a part where the copper powder is diffused in the iron powder; and sintering the molded raw material powder at less than or equal to 900° C., wherein the copper powder has an average grain size smaller than that of the iron powder, and wherein the copper powder that is partially diffused in the iron powder is free from an alloying element.

2. The process according to claim 1, wherein the copper powder having the plurality of grains partially diffused in the iron powder has an average grain size greater than or equal to 5 μm and less than 20 μm, and the partially diffusion-alloyed powder contains 10 to 30 mass % of Cu.

3. The process according to claim 1, wherein the partially diffusion-alloyed powder has an average granularity of less than or equal to 145 mesh.

4. The process according to claim 1, wherein the solid lubricant powder is a graphite powder, and the sintered bearing contains 10 to 30 mass % of Cu, 0.5 to 3.0 mass % of Sn, and 0.3 to 1.5 mass % of C, with the balance being iron and inevitable impurities.

5. The process according to claim 4, wherein the sintered bearing includes an iron structure composed primarily of a ferrite phase.

6. The process according to claim 5, wherein the iron structure includes the ferrite phase, and a pearlite phase existing at a grain boundary of the ferrite phase.

7. The process according to claim 1, wherein the iron powder is a reduced iron powder.

8. The process according to claim 1, wherein the sintered bearing is impregnated with a lubricating oil having a kinematic viscosity from 10 to 50 $mm^2/s$ at a temperature of 40° C.

9. A vibrating motor comprising a sintered bearing manufactured by the process according to claim 1.

10. A vibrating motor comprising a sintered bearing manufactured by the process according to claim 2.

* * * * *